United States Patent [19]

Lovrenich

[11] Patent Number: 4,671,129
[45] Date of Patent: Jun. 9, 1987

[54] ZERO BACKLASH SHIFTABLE TRANSMISSION

[76] Inventor: Rodger T. Lovrenich, 209 Whispering Sands, Santa Teresa, N. Mex. 88008

[21] Appl. No.: 725,234

[22] Filed: Apr. 19, 1985

[51] Int. Cl.$^4$ .......................... F16H 3/08; F16H 55/18
[52] U.S. Cl. ........................................ 74/370; 74/409
[58] Field of Search ................. 74/325, 363, 375, 370, 74/371, 372, 409, 369; 408/9; 409/231; 192/48.5, 67 P

[56] References Cited

U.S. PATENT DOCUMENTS

| | | | |
|---|---|---|---|
| 688,516 | 12/1901 | Harris | 74/370 |
| 778,859 | 1/1905 | Hobbs | 74/370 |
| 1,136,636 | 4/1915 | Wilkin | 74/363 X |
| 1,970,385 | 8/1934 | Maybach | 74/370 |
| 2,251,342 | 8/1941 | Rauen | 74/333 X |
| 2,309,864 | 2/1943 | Patterson | 74/370 |
| 3,422,724 | 1/1969 | Zankl et al. | 409/231 |
| 4,449,866 | 5/1984 | Lohenis | 74/342 |
| 4,458,549 | 7/1984 | Schreiner et al. | 74/409 X |

FOREIGN PATENT DOCUMENTS

| | | | |
|---|---|---|---|
| 460545 | 10/1913 | France | 74/370 |
| 1033053 | 7/1953 | France | 74/409 |

OTHER PUBLICATIONS

"Meltron Technical Data Sheet", Series 7, Nov. 1953.

Primary Examiner—Leslie Braun
Assistant Examiner—Dirk Wright
Attorney, Agent, or Firm—Barnes, Kisselle, Raisch, Choate, Whittemore & Hulbert

[57] ABSTRACT

A zero backlash shiftable transmission includes an input shaft and an output shaft coupled through a gear network that is preloaded with a spring arrangement to eliminate the backlash from the engaged surfaces of the gear teeth. There are three positions and no neutral. In the first position a tapered clutch arrangement engages the input shaft directly with the output shaft. In the second or shift position, the clutch engages both the input shaft and the output shaft while the transmission is slowed or stopped for shifting. In the third position, the clutch engages the input shaft with the output shaft through the preloaded gear network. The tapered clutch arrangement provides locked clutch coupling in the first and third positions and provides tolerance for shifting without completely releasing either the input shaft or the output shaft in the shift position.

11 Claims, 8 Drawing Figures

ZERO BACKLASH SHIFTABLE TRANSMISSION

The present invention relates to a shiftable transmission that eliminates backlash in the operative positions of the transmisison.

BACKGROUND OF THE INVENTION

Conventional shiftable transmissions use gears and splines incorporating backlash so that the transmission can be shifted. This backlash causes error and downgrades the ability to determine or hold position of the output shaft of the transmission. Various attempts have been made to solve the problems arising as the result of backlash in simple gear sets. Such attempts don't adapt will to shiftable transmissions and result in complex devices that have not been successful.

In industries such as the automated machine tool industry, it is important to be able to determine and hold position of a transmission output shaft via its input shaft, and to make every effort to reduce the effects of backlash. The cost of down time to repair or exchange splined components and gears is monumental in an installation such as an automated production line in the automotive industry.

BRIEF SUMMARY OF THE INVENTION

The shortcomings of the prior art shiftable transmissions are overcome by an exemplary embodiment of the present invention that includes an input shaft and an output shaft coupled through a gear network that is preloaded with a spring arrangement to eliminate the backlash from the engaged surfaces of the gear teeth.

The transmission includes a clutch that has three positions. There is no neutral position. In the first position the clutch engages the input shaft directly with the output shaft. In the second or shift position, the clutch engages both the input shaft and the output shaft while the transmission is slowed or stopped for shifting. In the third position, the clutch engages the input shaft with the output shaft through the preloaded gear network.

Tapered clutch surfaces in the clutch provide locked clutch coupling in the first and third positions and provide tolerance for shifting without completely releasing either the input shaft or the output shaft in the shift position.

DETAILED DESCRIPTION OF THE INVENTION

Figures 1, 2:
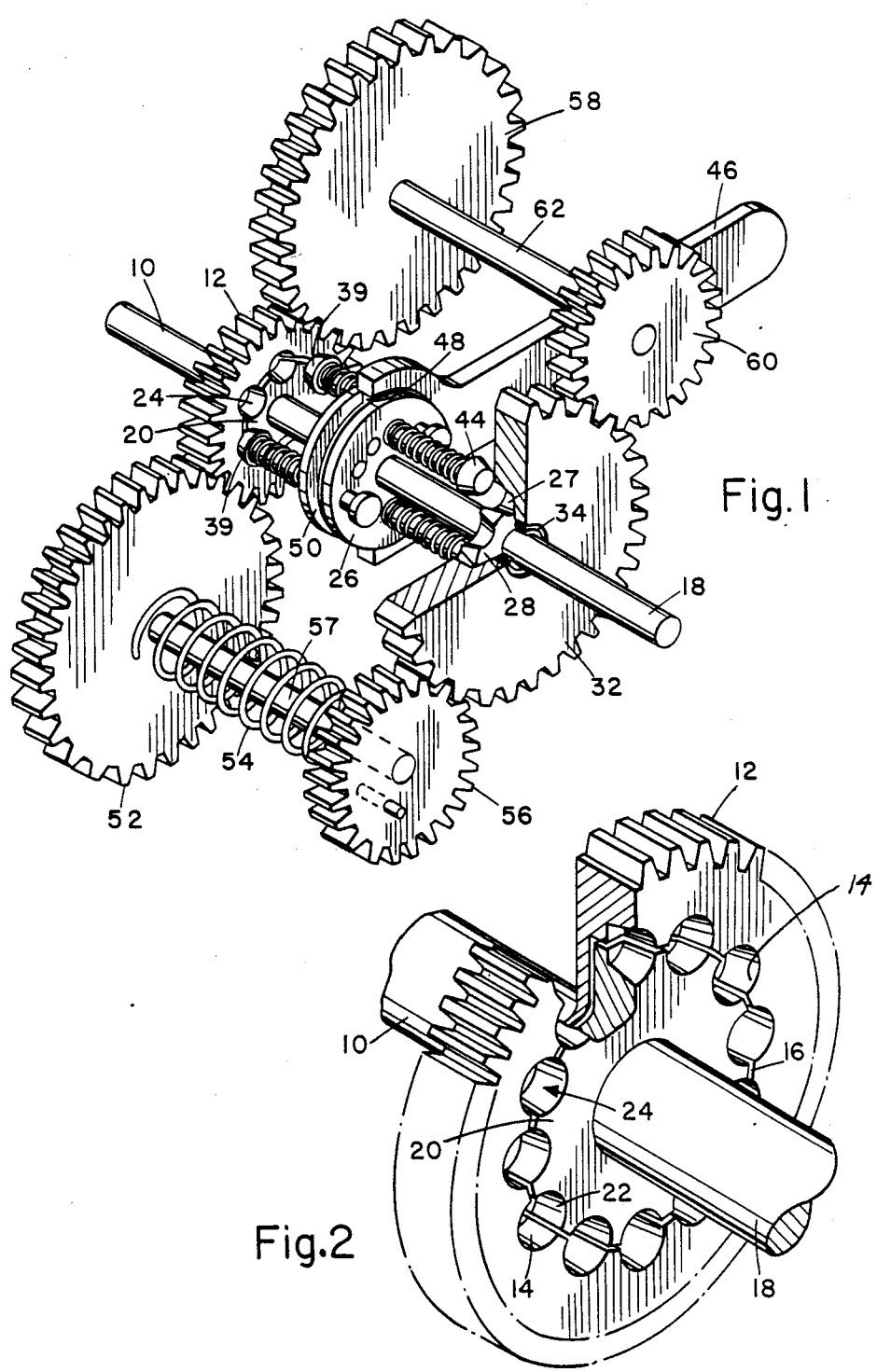
FIG. 1 is a perspective view, partly sectioned, of the zero backlash shiftable transission of the present invention.
FIG. 2 is a perspective view, partly sectioned, of the input gear and showing the pockets formed by the input gear and its associated pocket wheel.

Referring to the drawings, the zero backlash shiftable transmission of the present invention includes an input shaft 10 rotatable by a power source such as an electric motor (not shown) for example. The input shaft 10 is fixed to an input gear 12. The input gear 12 includes a plurality of tapered pocket portions 14 that face into the open center 16 of the input gear 12 (FIG. 2). An output shaft 18 is substantially aligned with the input shaft 10 and includes a pocket wheel 20 at one end having tapered pocket portions 22 that form tapered pockets 24 when rotationally aligned with the pocket portions 14 in the input gear 12.

Figure 5:
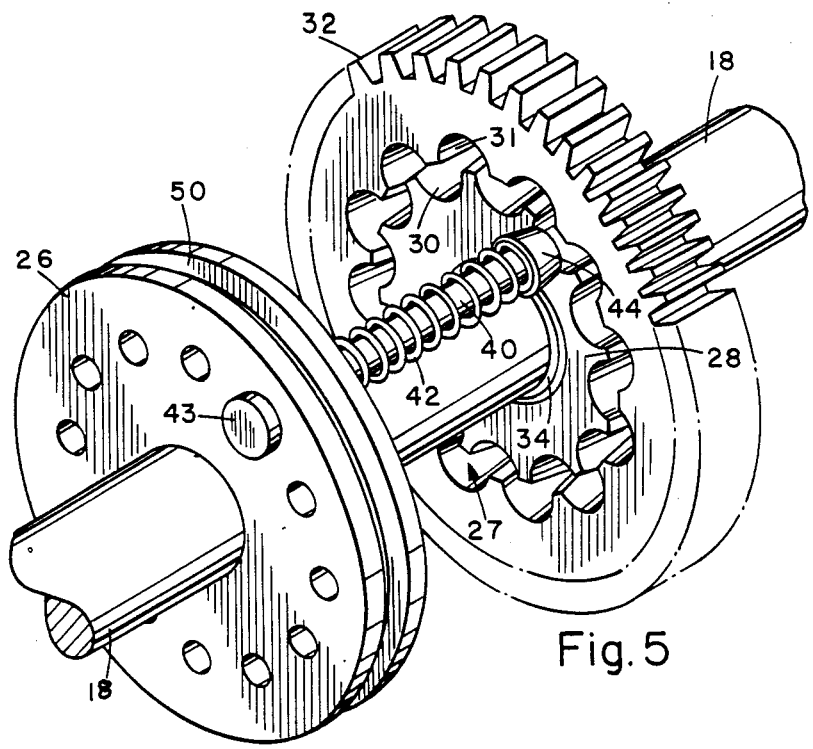
FIG. 5 is a view, similar to FIG. 4, of the output gear and associated pocket wheel showing a lock head and pin withdrawn by the shift collar from the locked position to the free position in the high speed condition of the transmission as shown in FIG. 1.
Figure 6:
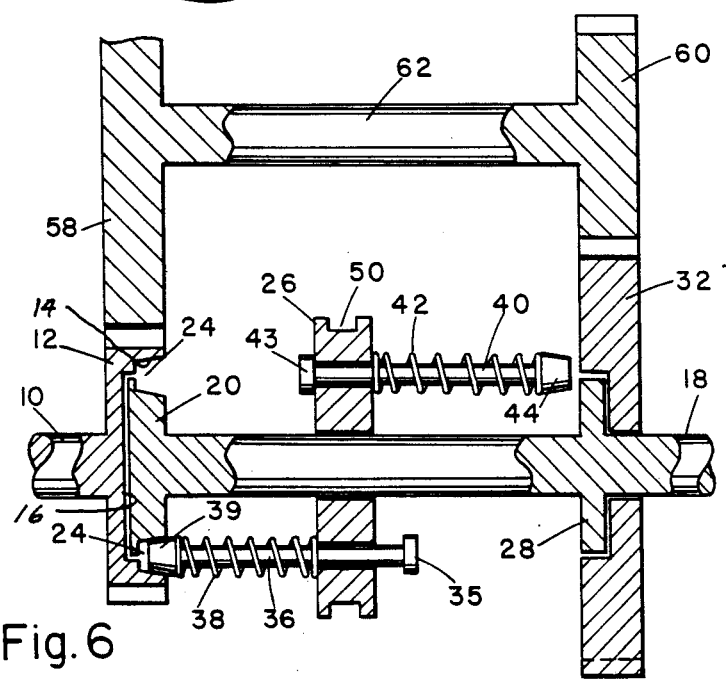
FIG. 6 is a schematic view showing the device shifted to the high speed position of FIG. 1.

The output shaft 18 extends through the center of shift collar 26 (FIG. 1) and includes pocket wheel 28 similar in construction to pocket wheel 20. Tapered pocket portions 30 (FIG. 5) are formed on the pocket wheel 28. An output gear 32 seats on bearing 34 that is engaged with the output shaft 18, and output gear 32 is rotatable on shaft 18. Output gear 32 has tapered pocket portions 31 therein as shown in FIG. 5. The pocket wheel 28 is positioned within the open center portion of output gear 32.

Figure 3:
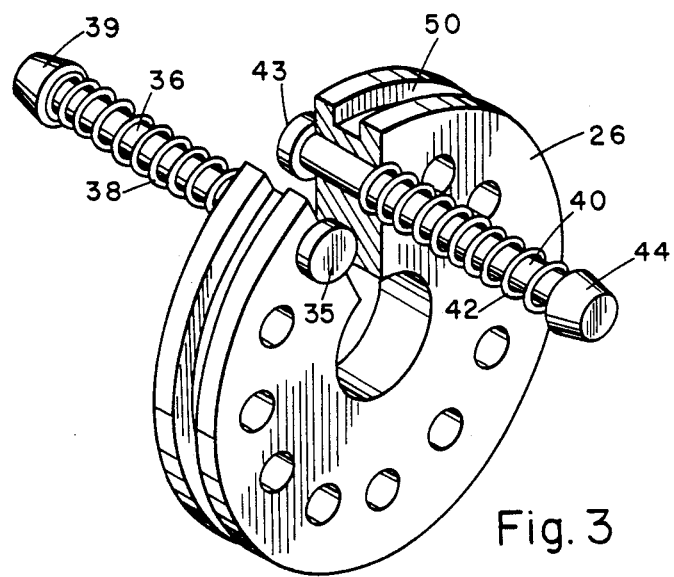
FIG. 3 is a perspective view, partly sectioned, of the shift collar and its associated pins.
Figure 4:
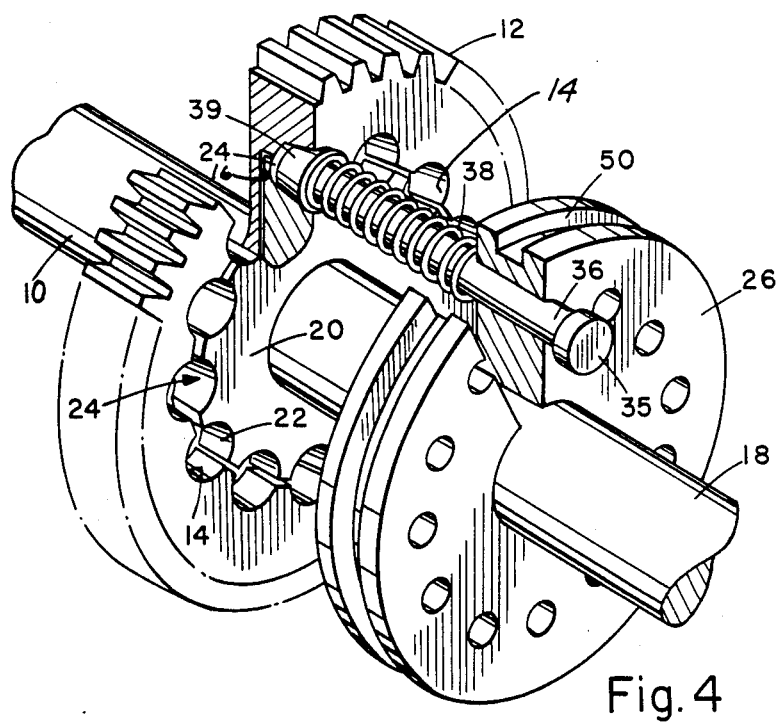
FIG. 4 is a perspective view, partly sectioned, of the input gear and associated pocket wheel with a lock head completely inserted by the shift collar and pin into the pocket formed by the input gear and pocket wheel to create the high speed condition of the transmission as shown in FIG. 1.

Shift collar 26 is shown in FIG. 3 and includes pins 36, only one of which is shown, extending from one side toward input gear 12. Each pin 36 has a retaining head 35 and is surrounded by a coil spring 38 extending between the shift collar 26 and a tapered lock head 39 affixed on the end of the pin. The pins 36 are slidable in the shift collar 26 against the springs 38. The lock heads 39 are adapted to extend into the pockets 24 (FIG. 2) formed when the pocket portions 14 and 32 are rotationally alined. Pins 40, only one of which is shown, with coil springs 42, retaining heads 43 and tapered lock heads 44 extend from the opposite side of shift collar 26 for insertion into the pockets 27 formed by pocket portions 30 and 31 when the pocket portions are rotationally aligned (FIG. 5). The lock heads do not extend all the way into the pockets when fully seated.

Although straight sided tapers are shown on the lock heads and pockets, it is to be understood that curved tapers are also acceptable. The tapering of the lock heads and pockets permits ready seating of the heads in the pockets even after wear of the gear teeth causes some misalignment of the lock heads and pockets.

A shift lever 46 (FIG. 1) has two diametrically opposed pins 48 at the top and bottom seated in the groove 50 in the shift collar 26 for moving the shift collar 26 along the output shaft 18. The shift lever 46 moves the tapered lock heads 39 into the pockets 24 formed by the pocket portions 14 on input gear 12 and the pocket portions 22 on the pocket wheel 20 in one shifted position (high speed) with the tapered lock heads 44 free of the pockets 27 (FIGS. 1 and 5).

Figure 8:
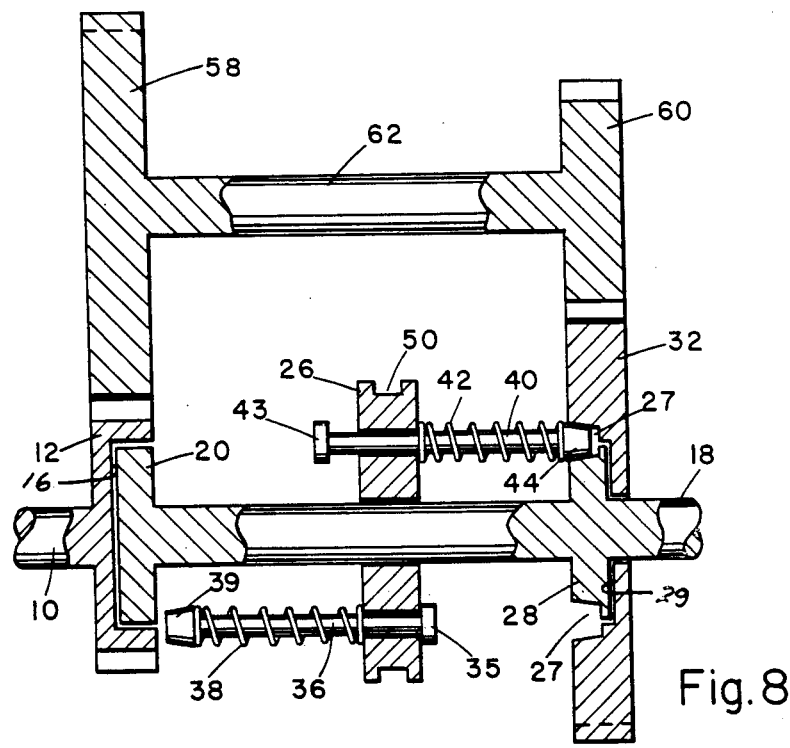
FIG. 8 is a schematic view showing the device shifted to the low speed position when the shift lever is moved to the right in FIG. 1.

When the drive gear 12 slows down or stops, shift yoke 26 can be moved to the right in the drawing to the low speed position (FIG. 8). The tapered lock heads 39 are gradually withdrawn from the pockets 24 to the position shown in FIG. 8, and the tapered lock heads 44 move into the pockets 27 formed by the output gear 32 and the pocket wheel 28.

Figure 7:
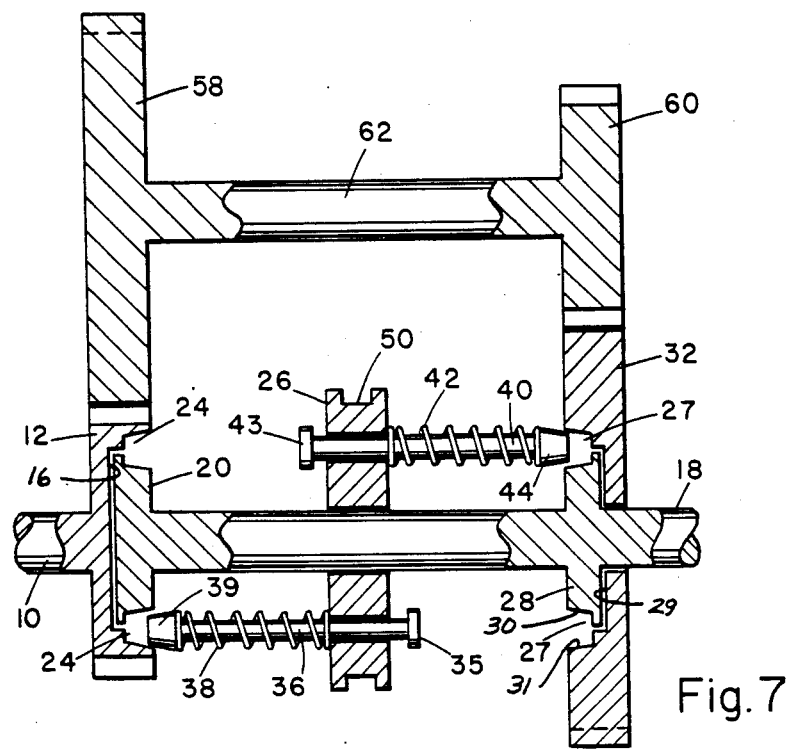
FIG. 7 is a schematic view showing the device during shifting.

When shifting the yoke 26 between the operating positions, one set of lock heads gradually moves out of the associated pockets while the other set of lock heads moves gradually into the other pockets that are being rotationally aligned as shown in FIG. 7. Backlash is created during this motion by the tapers and there is a loose or unlocked coupling of the input gear 12 to the output gear 32. Contact with the position shifted from is released when the tapered lock heads completely seat in the pockets in the position shifted to, and backlash is eliminated. Coupling between the input shaft and the output shaft is not lost during the shifting procedure.

Referring to FIG. 1, input gear 12 is meshed with gear 52. Gear 52 is engaged with one end of coil spring 54. The other end of coil spring 54 is connected to gear 56. During assembly the gears 52 and 56 are rotated in the opposite direction with the coil spring 54 attached to store energy in the spring, and then the gears 52 and 56 are meshed with gears 12 and 32. At least one of the gears 52 and 56 freely rotates on shaft 57.

In the embodiment shown, gear 58 is the same size and has the same number of teeth as gear 52 and is connected to gear 60 by shaft 62. Gear 60 is the same size and has the same number of teeth as gear 56 in this embodiment. Gear 60 meshes with gear 32. Gears 58 and 60 are fixed on shaft 62. The gears do not have to be the same size and have the same number of teeth.

The energy stored in coil spring 54 forces zero backlash toothed engagement throughout the gear train consisting of gears 12, 58, 60, 32, 56 and 52 and removes the backlash out of the gear train in operation.

Drive from the input shaft is transferred either directly to the output shaft 18 with the position of the shift lever 26 as shown in FIGS. 1, 4, 5 and 6 of the drawings, or through the entire gear assembly when the shift lever 26 is moved to the right in the drawing as shown in FIG. 8.

Precision is obtained in rotating the output shaft and holding it, or determining the position of the output shaft relative to the input shaft. This is accomplished with a simple and inexpensive arrangement.

Having thus described my invention, I claim:

1. A zero backlash shiftable transmission, comprising:
   an input gear mounted on an input shaft and an output gear mounted on an output shaft, one of said gears rotatably mounted on its shaft as a free gear and the other gear fixed to its shaft as a fixed gear;
   countershaft assembly means having gears meshed with said input gear and said output gear and including anti-backlash means for forming a zero backlash gear train between said input gear and said output gear;
   tapered pocket portions in said input gear and said output gear;
   pocket wheel means on the input shaft or output shaft and having tapered pocket portions for forming tapered input pockets with the tapered pocket portions in the input gear and tapered output pockets with the tapered pocket portions in the output gear;
   shiftable clutch means having tapered lock heads, some extending toward the input pockets and some extending toward the output pockets and constructed and arranged so that drive is transferred directly from said input shaft to said output shaft when the lock heads are seated in the pockets formed by the fixed gear, and drive is transferred through the gear train when the lock heads are seated in the pockets formed by the free gear, the tapered lock heads maintaining engagement with both the tapered input pockets and tapered output pockets during shifting.

2. A zero backlash shiftable transmission according to claim 1 wherein the countershaft assembly means includes:
   first countershaft assembly means including a first gear in mesh with said input gear and fixed to a first countershaft, and a second gear fixed to said first countershaft and in mesh with said output gear;
   second countershaft means including a third gear in mesh with said input gear and mounted on a second countershaft, and a fourth gear mounted on said second countershaft, at least one of said third and fourth gears being rotatable on said second countershaft; and
   preload means in said second countershaft assembly means for urging said third and fourth gears in opposite directions of rotation.

3. A zero backlash shiftable transmission according to claim 1 wherein said input pockets are formed in the face of said input gear and said output pockets are formed in the face of said output gear; and
   said clutch means includes shift collar means slidably disposed over the shaft having the pocket wheel means with spring loaded lock pins extending from one side toward said input pockets and spring loaded lock pins extending from the other side toward said output pockets, said lock pins having tapered lock heads on the free ends thereof;
   said lock pins slidable to a limited extend in said shift collar means.

4. A zero backlash shiftable transmission, comprising:
   an input gear mounted on an input shaft and an output gear mounted on an output shaft, one of said gears rotatably mounted on its shaft as a free gear and the other gear fixed to its shaft as a fixed gear;
   first countershaft assembly means including a first gear in mesh with said input gear and fixed to a first countershaft, and a second gear fixed to said first countershaft and in mesh with said output gear;
   second countershaft means including a third gear in mesh with said input gear and mounted on a second countershaft, and a fourth gear mounted on said second countershaft, at least one of said third and fourth gears being rotatable on said second countershaft;
   pre-load means in said second countershaft assembly urging said third and fourth gears in opposite directions of rotation;
   tapered pocket portions in the face of the input gear and the face of the output gear;
   pocket wheel means on the input shaft or output shaft and having tapered pocket portions for forming tapered input pockets with the tapered pocket portions in the input gear and tapered pockets with the tapered pocket portions in the output gear; and
   shiftable clutch means including shift collar means slidably disposed over the shaft having the pocket wheel means with spring loaded lock pins extending from one side toward said input pockets and spring loaded lock pins extending from the other side toward said output pockets, said lock pins having tapered lock heads on the free ends thereof, said lock pins being slidable to a limited extent in said shift collar means;

whereby drive is transferred directly from said input shaft to said output shaft when the lock heads are seated in the pockets formed by the fixed gear, and drive is transferred through the gear train when the lock heads are seated in the pockets formed by the free gear, the tapered lock heads maintaining engagement with both the tapered input pockets and tapered output pockets during shifting.

5. A shiftable transmission comprising an input shaft coupled to an input gear, an output shaft having first and second rotation-transmitting means affixed thereto and spaced from each other axially on said output shaft, gear transmission coupled to of said shafts and clutch means positioned between said rotation-transmitting means and movable axially along said output shaft for selectively engaging said input shaft to said output shaft through said input gear and said first rotation-transmitting means in one position of said clutch means and for engaging said input shaft to said output shaft through said gear transmission means and said second rotation-transmitting means in another position of said clutch means said gear transmission means including an output gear rotatably carried by said output shaft, said first and second rotation-transmitting means being respectively positioned adjacent to said input gear and said output gear, said clutch means comprising means for selectively coupling said output shaft and said rotation-transmitting means affixed thereto either to said input gear or to said output gear, said input gear and said output gear including opposed recesses, said rotation-transmitting means being rotatably positioned in said recesses, said recesses and said rotation-transmitting means including opposed pocket portions which cooperate when in radial alignment to form angularly spaced arrays of pockets between said input gear and said first rotation-transmitting means and between said output gear and said second rotation-transmitting means, said clutch means including means for selective seating in one or the other array of said pockets.

6. The transmission set forth in claim 5 wherein said clutch means includes a yoke slidably carried by said output shaft between said rotation-transmitting means, pins projecting in opposite axial directions from said yoke, each of said pins having a head for seating in pockets of one of said arrays.

7. The transmission set forth in claim 6 wherein said clutch means further comprises a spring surrounding each said pin and urging the associated said head axially of said yoke.

8. The transmission set forth in claim 7 wherein axial lengths of said pins and heads are coordinated with axial separation of said arrays of pockets such that said heads engage said pockets simultaneously and said output shaft remains coupled to said input shaft during shifting of said transmission.

9. The transmission set forth in claim 8 wherein said heads and said pockets possess complementary conical geometries.

10. The transmission set forth in claim 8 further comprising a pair of gears respectively coupled to said input gear and said output gear, and means biasing said pair of gears for opposed rotation so as to absorb backlash from said input gear through said gear transmission means.

11. The transmission set forth in claim 10 wherein said pair of gears are carried by a common shaft, at least one of said pair of gears being freely rotatable on said common shaft, and wherein said biasing means comprises a coil spring encircling said common shaft.

* * * * *